Dec. 6, 1955 — R. P. HERZFELD — 2,725,804

STEREO CAMERA ATTACHMENT

Filed Jan. 17, 1955 — 3 Sheets-Sheet 1

INVENTOR.
RICHARD P. HERZFELD
BY
John W. Michael
ATTORNEY

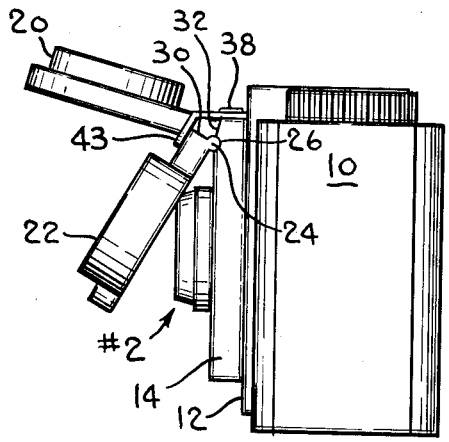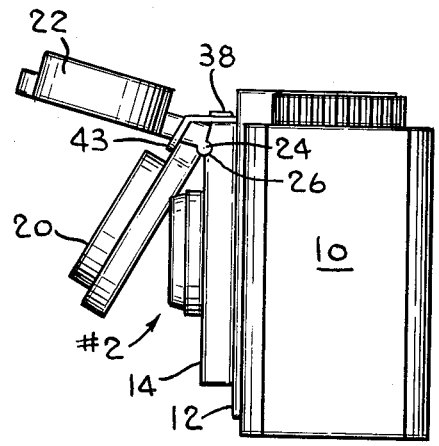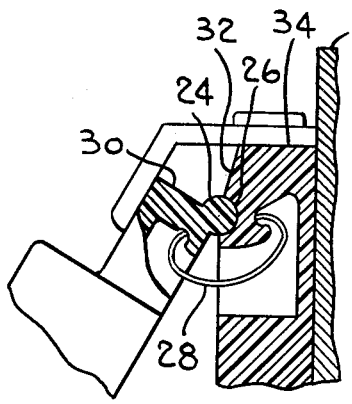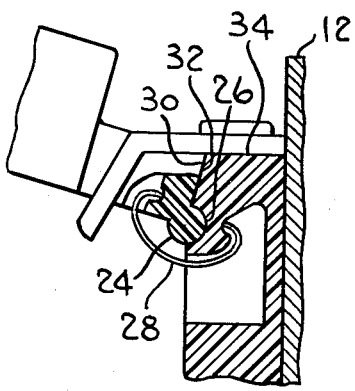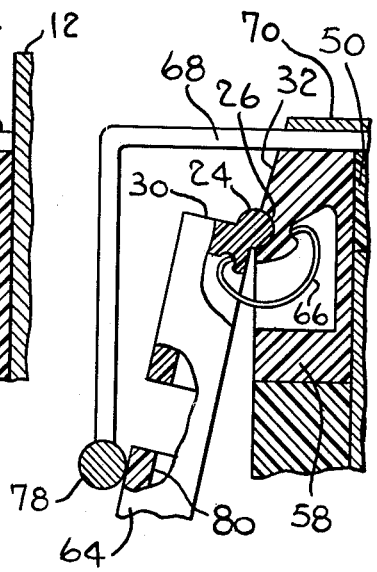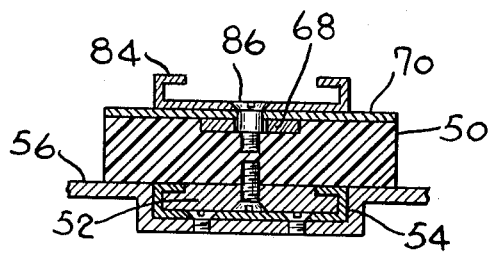

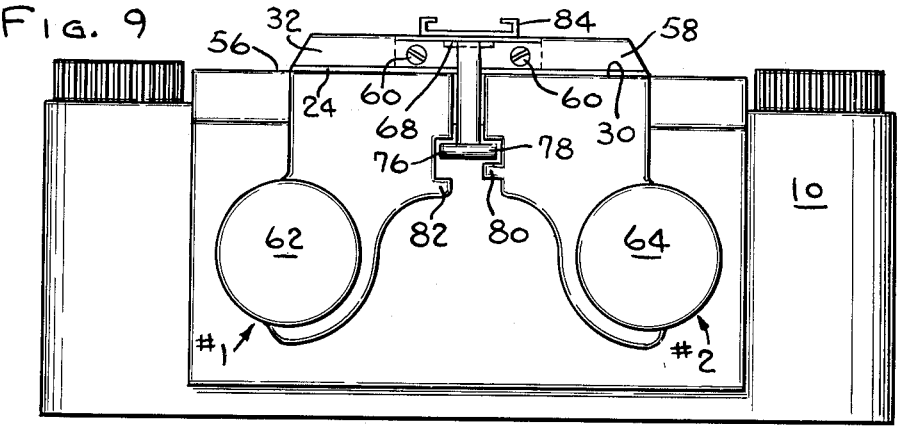
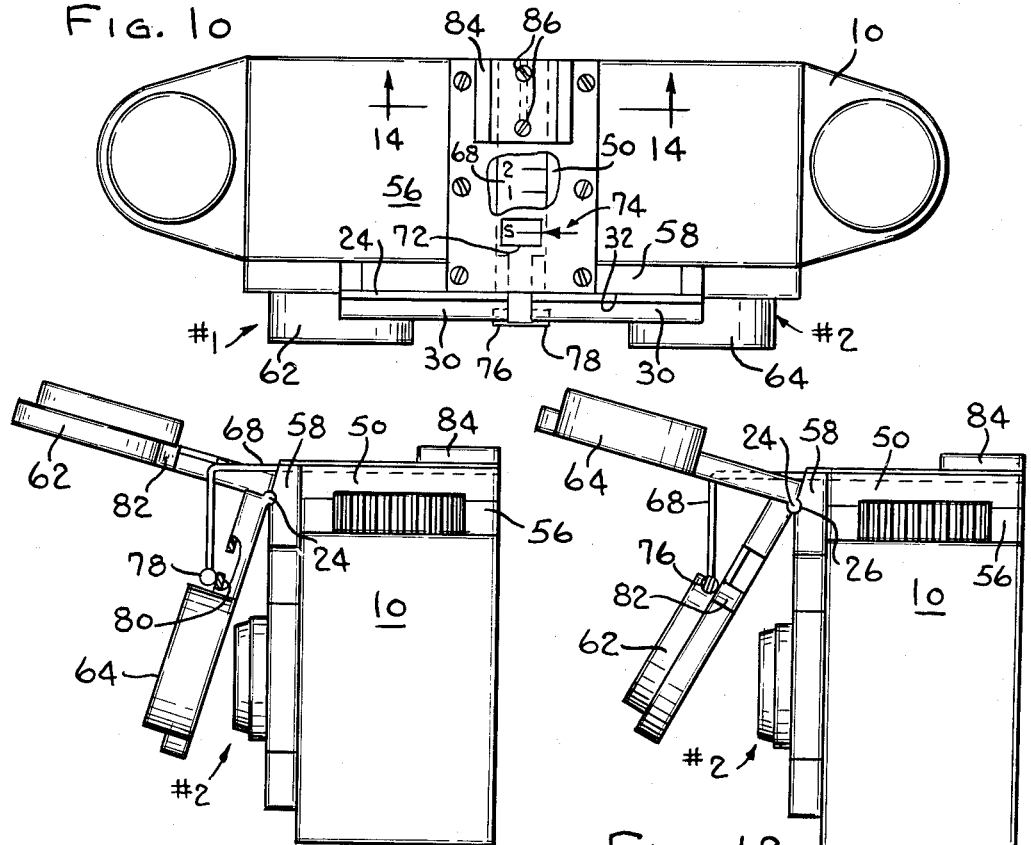

United States Patent Office 2,725,804
Patented Dec. 6, 1955

2,725,804

STEREO CAMERA ATTACHMENT

Richard P. Herzfeld, Milwaukee, Wis.

Application January 17, 1955, Serial No. 482,038

10 Claims. (Cl. 95—18)

This invention relates to stereo cameras and particularly to provision of an attachment for such cameras to facilitate making single frame exposures in lieu of the usual stereo pair.

In normal operation of a stereo camera a pair of transparencies are exposed simultaneously. There are occasions where the subject matter to be photographed does not lend itself to or would not be improved by stereo reproduction and in such instances it is desirable to make the conventional two dimensional exposure on a single frame. This can be done with a stereo camera by first capping one lens and exposing through the other to expose only one of the two frames aligned with the lenses. For the next exposure the lens cap can be moved from the first to the second lens to expose the other frame, thus avoiding waste of film. Following the second exposure, the film is wound to bring a new pair of unexposed frames into position. This procedure can be practiced with the camera and one lens cap, but in practice it is generally found that the photographer forgets which frame has been exposed etc., resulting in waste of film or double exposures (usually on one of a stereo pair).

The principal object of this invention is to provide an attachment for stereo cameras to facilitate the above procedure and to minimize the chance for error. The device incorporates an indicator showing whether the camera is set for stereo or single frame and, if the latter, which lens is to be used.

Other objects and advantages will be pointed out in, or be apparent from, the specification and claims, as will obvious modifications of the two embodiments shown in the drawings in which:

Fig. 5 is an end view of the same camera showing the manner in which the control bar prevents opening of the near lens cap while the far lens cap may be opened when the bar is in the No. 1 position as shown in Fig. 3;

Fig. 6 is a view similar to Fig. 5, but shows the control bar in the No. 2 position in which the near lens cap may be opened while the far lens cap cannot be opened;

Fig. 7 is an enlarged view, partly in section, showing the details of the lens cap toggle-hinge construction and also shows the manner in which the control bar prevents opening the lens cap;

Fig. 8 is a view similar to Fig. 7, but shows the control bar permitting the lens cap to be opened;

Fig. 9 is a front elevation of a similar camera provided with an attachment according to the present invention with the attachment being mounted in the accessory shoe customarily found on cameras;

Fig. 10 is a top plan view of the camera shown in Fig. 9 and has a portion broken away to show the manner in which indicia are provided on the sliding bar;

Fig. 11 is a view showing how the control bar of this modification prevents opening the near lens cap in the No. 1 position;

Fig. 12 is a view similar to Fig. 11 showing the manner in which the far lens cap is held closed by the control bar in the No. 2 position;

Fig. 13 is an enlarged view partly in section of the hinge construction employed on the second modification; and Fig. 14 is a section taken on line 14—14 in Fig. 10 to show the mounting of the attachment in the accessory shoe. It will be noted that the construction contemplates a shoe carried by the accessory so that other devices may still be mounted on the camera.

Figure 1:
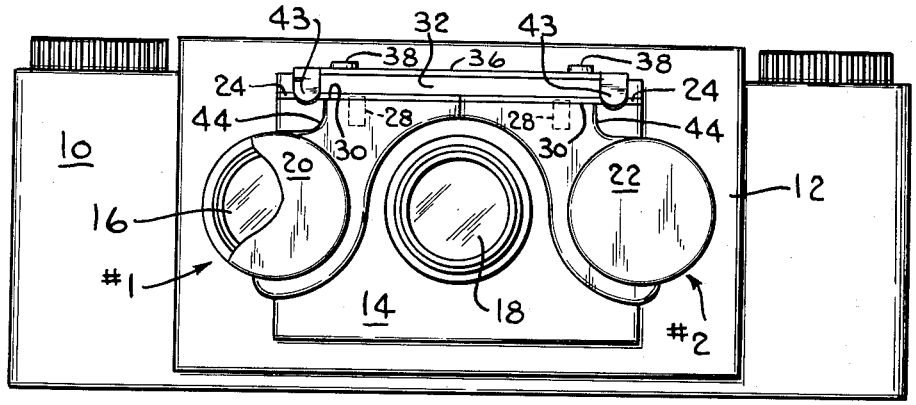
Fig. 1 is a front elevation of one type of stereo camera fitted with an attachment according to the present invention.

Figs. 1 through 8 illustrate somewhat schematically the well-known Realist camera in which the body 10 is provided with a fixed lens board 12 which carries much of the shutter mechanism etc. behind the plastic panel 14. The taking lenses 16 (also designated as No. 1 and No. 2) are mounted on the lens board 12, as is the view finder lens 18. This camera is customarily provided with a one-piece lens cover hinged at the top edge of the panel 14 to cover all three lenses when closed and to act as a partial sun shade when open.

In order to adapt the present invention to this camera, the customary one-piece lens shade is removed and in its place are mounted two lens caps 20, 22 which cover lenses Nos. 1 and 2 when closed as shown in Fig. 1. These lens caps are hingedly mounted on panel 14 in much the same manner as the customary one-piece lens shade. Thus, the top edge of each cap is provided with a longitudinal rib 24 which is received in the longitudinal groove 26 to allow the hinging action. The U-shaped spring 28 holds the rib into the groove and additionally acts as a toggle spring. Thus, when the lens shade is in the position shown in Fig. 7, the spring force acts on the shade in the direction tending to close the shade against the lens with which it is associated. On the other hand, moving the lens shade towards the open position causes the spring to exert its force on the opposite of the hinge so as to urge the lens shade towards its open position to the limit of motion determined by contact of the face 30 on the lens shade with the face 32 on panel 14.

Figure 2:
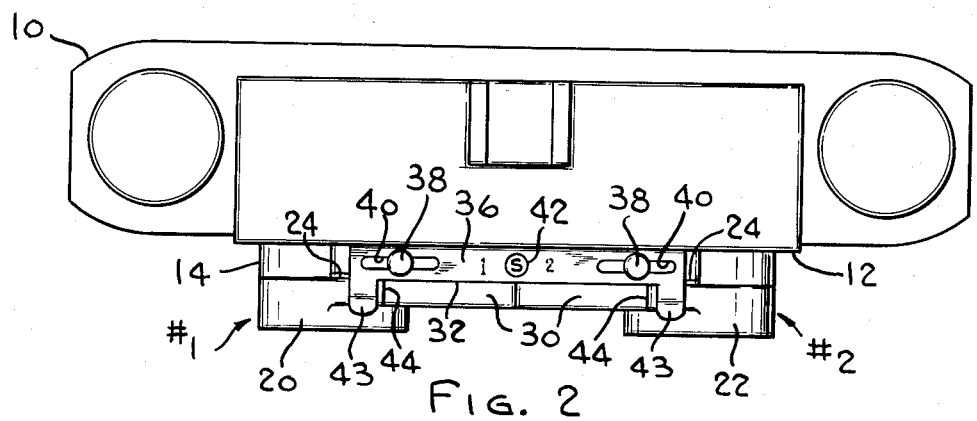
Fig. 2 is a top plan view of the camera shown in Fig. 1 with the control bar set in the stereo position.
Figure 3:
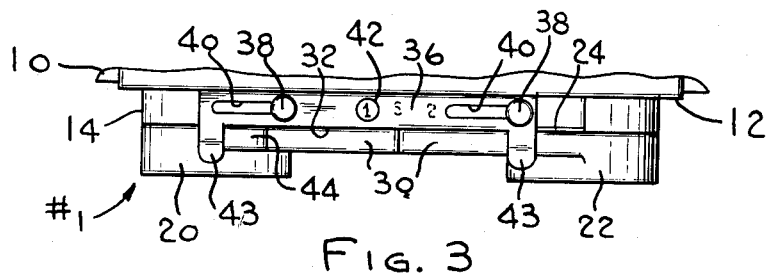
Fig. 3 is a view similar to Fig. 2, but shows the control bar moved to the left to the No. 1 position.
Figure 4:
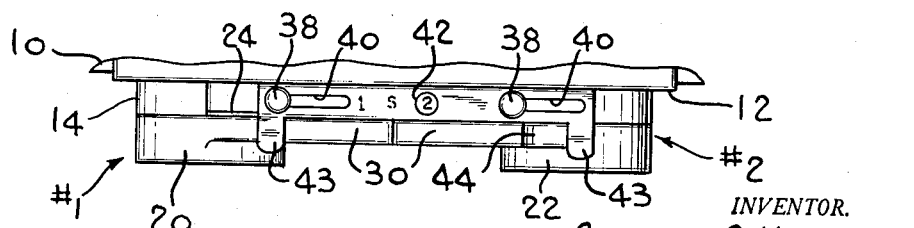
Fig. 4 is a view similar to Fig. 3, but shows the bar in the No. 2 position.

As may be seen in Figs. 2 through 4, the letter "S" and the numerals "1" and "2" are applied centrally of the top surface 34 of panel 14. A sliding control bar 36 is slidably mounted on the top of panel 14 by screws or pins 38 passing through the elongated slots 40 in the bar 36 into the panel 14. The screw heads frictionally engage the control bar so that it will remain in any position in which it is set between the limits determined by engagement of the ends of slots 40 with the pins. In Fig. 2 the control bar is fixed centrally of the panel 14 and the aperture 42 registers with the letter "S" on the top of panel 14. This indicates that the control bar is in the stereo position wherein each of the fingers 43 projecting outwardly and downwardly from the ends of the control bar are positioned above the arcuate cut-out portions 44 in the lens caps 20 and 22. In this position the lens caps may be opened in the normal fashion.

If the bar is moved to the left, as in Fig. 3, the aperture 42 registers with the numeral "1" on the top of panel 14. In this position, the left-hand finger 43 does not interfere with opening movement of the lens cap 20, but the right-hand finger 43 now obstructs opening movement of the right-hand lens cap 22. Thus, as viewed in Fig. 5, the lens cap 20 can be opened while the lens cap 22 cannot be opened past the position shown. This position is also shown in Fig. 7 where it will be noted that the toggle spring still exerts its force on the lens cap in the closing direction. Therefore, as soon as the photographer releases this lens cap, it will snap shut to prevent exposing film through the lens associated therewith. Therefore, with the control bar set in the No. 1 position, pictures can be taken only through No. 1 lens. If the control bar is shifted to the right, as in Fig. 4, to register the opening 42 with numeral "2," the left-hand finger 43 now obstructs opening movement of lens cap 20 while allowing cap 22 to open as in Fig. 6.

It will be appreciated that with the present accessory equipment the photographer can use his stereo camera for taking single frame pictures with considerably less chance for error, particularly if he develops a habit of shifting the control bar from the No. 1 position to the No. 2 position immediately after taking the picture on the No. 1 film. When he next uses the camera, there can be no mistake that the No. 1 film is exposed and that he must now either expose a single frame shot through the No. 2 lens or sacrifice the No. 2 piece of film and advance the film in the camera so as to expose a new stereo pair for the purposes of taking a stereo photograph.

Many cameras do not have the panel 14 on the lens board and for this reason cannot be provided with the accessory just described. However, just about all cameras produced today have a so-called accessory shoe on the top of the camera in which auxiliary range finders, flash guns and the like may be mounted. The modification shown in Figs. 9 through 14 utilizes the accessory shoe as a mounting place for a similar attachment. This attachment has a plate 50 having the usual adapter 52 on its underside to slide into the accessory shoe 54 mounted on the top 56 of the camera. Since the shoes generally open to the rear of the camera, the plate is first mounted on the camera and then the front hinge plate 58 is secured to the forward face of the plate 50 by screws 60, 60. This hinge plate has a hinge construction similar to that in the first described embodiment as shown in Fig. 13. Thus, lens caps 62, 64 covering lenses Nos. 1 and 2, respectively, are biased by the toggle spring 66 to either the open or closed position. Tongue 68 slides in a cooperating groove on the top of plate 50 under cover plate 70 and has the letter "S" and numerals "1" and "2" embossed thereon to register with window 72 at the indicator arrow 74 to indicate the operating condition of the device. The forward portion of tongue 68 is turned downwardly at approximately a right angle and supports on its lower end the laterally projecting fingers 76, 78. As shown in Fig. 9, the fingers 76, 78 register with openings on the central portion of the lens caps 62, 64 so as to permit both lens caps to be opened. This corresponds to the setting of the tongue as shown in Fig. 10. However, when the tongue is moved forwardly to register the numeral "1" with the indicator arrow 74, the finger 78 will obstruct lug 80 on cap 64 to prevent opening the cap over the No. 2 lens. Of course, cap 62 over the No. 1 lens may be opened. If the tongue is moved outwardly to register the numeral "2" with arrow 74, finger 76 will obstruct lug 82 to prevent opening of the No. 1 cap while allowing the No. 2 cap to open. The last two described settings are respectively shown in Figs. 11 and 12.

It will be apparent, of course, that this accessory shoe type of mounting can also be employed in conjunction with a sliding bar such as shown in Figs. 1 through 8. The purpose of showing both constructions is to show the various ways in which the present invention may be carried out. It will also be appreciated that the sliding bar does not necessarily have to have two depending fingers 42, but could have one central finger in which event the central portion of the lens caps structures would be cut out rather than the end portions.

The embodiment which mounts on the accessory shoe may conveniently be provided with an extra shoe 84 secured by screws 86, 86 to the top of the assembly. This will permit the photographer to continue to mount such accessories as a flash gun on the camera.

In both embodiments the lens board is shown as being fixed. There are a number of stereo cameras which employ a movable lens board, but since the focal length of the lenses customarily employed in stereo photography runs in the neighborhood of 35 mm., the actual movement of the lens is quite small and the present lens cap system can be made to work equally well with the movable lens board construction. The first embodiment is somewhat in the nature of a custom installation, while the second embodiment can be a more universal type construction, the only difference being that the construction of tongue 68 would have to be varied in order to accommodate the different locations of the accessory shoe on the various cameras. In stereo photography the interocular distance remains substantially constant and so the forward portion of each accessory would be the same. The same comments hold true if the accessory shoe type mounting is employed with the type of construction shown in Figs. 1 through 8.

It will be apparent to those skilled in the art that various changes and modifications may be made therein without departing from the spirit of the invention or from the scope of the appended claims.

I claim:

1. A stereo camera attachment comprising, a support, a pair of lens caps pivotally mounted on the support each being associated with one of the taking lenses of the camera and independently manually movable between a lens capping position and an open position, an index member slidably mounted on the support and movable between a first setting in which both caps may open and a second setting in which the index member obstructs movement of one cap to its open position and a third setting in which the index member obstructs movement of the other cap to its open position.

2. A stereo camera attachment acording to claim 1 in which the pivotal mounting of the caps on the support includes toggle acting means urging each cap to its capping or open position, said index member obstructing movement of either cap at a point preventing movement of the cap over center whereby the cap will return to its capping position when released.

3. A stereo camera attachment according to claim 2 in which the axis of the pivotal mounting is parallel to the top of the camera and is above the taking lenses, said index member being slidably mounted above said axis and having an obstructing finger depending below said axis.

4. A stereo camera attachment according to claim 3 including indicia associated with the index member to give a visual indication of the setting of the index member.

5. A stereo camera attachment according to claim 4 in which the index member is movable parallel to the pivot axis.

6. A stereo camera including, a body having a pair of taking lenses, a pair of lens caps pivotally mounted on the body above the lenses for independent movement between positions in which the lenses are capped or open, an index member slidably mounted on the body above the pivot axis, said member including depending finger means operable to obstruct opening one cap in one setting and to obstruct opening the other cap in a second setting and inoperative to obstruct either cap in a third setting.

7. A camera according to claim 6 in which the pivotal mounting of the caps include toggle means biasing thec aps either to the capping or open position depending upon which side of center the cap is located, said finger means when operative to obstruct a cap acting to prevent moving the cap over-center from the capping position.

8. A stereo camera according to claim 6 in which the camera body is provided with an accessory shoe and the caps and index member are mounted on a support mounted in the shoe.

9. A device for use with stereo cameras comprising, a support adapted to be fixed on the camera, a pair of spaced lens caps pivotally mounted on the support so that each can cover one lens and is movable to a second position outside the field of the lens, an index member mounted for slidable movement with respect to the support and having means thereon engageable with either of the caps to prevent movement of the cap to its second position, said index member having a position in which it does not engage either cap.

10. A device for use with a stereo camera comprising, a support adapted to be fixed on a stereo camera, a pair of lens caps mounted on the support and being laterally spaced to overlie the two lenses on the camera, the caps being pivotally mounted on the support for movement between one position in which each cap covers the lens with which it is associated and a second position in which the lens is unobstructed, an index member mounted for slidable movement with respect to the support, cooperating means on the index member and the lens caps for preventing movement of one lens cap to its second position while allowing movement of the other cap when the member is in a first position, preventing movement of the other cap to the second position while allowing movement of the one cap when the member is in a second position, and allowing movement of both caps to the second position when the member is in a third position.

No references cited.